United States Patent [19]

Kazemzadeh

[11] Patent Number: 5,587,193
[45] Date of Patent: Dec. 24, 1996

[54] PROCESS FOR MANUFACTURING FAT-ENRICHED FOODS

[75] Inventor: Massoud Kazemzadeh, Bloomington, Minn.

[73] Assignee: MJM Technologies, Stacy, Minn.

[21] Appl. No.: 527,005

[22] Filed: Sep. 12, 1995

[51] Int. Cl.⁶ .................................................. A23K 1/00
[52] U.S. Cl. ................ 426/448; 426/438; 426/477; 426/516; 426/445; 426/447; 426/518; 426/526; 426/651; 426/98; 426/635; 426/417
[58] Field of Search ........................... 426/438, 477, 426/516, 445, 447, 448, 454, 518, 520, 651, 98, 601, 623, 630, 635, 805, 417

[56] References Cited

U.S. PATENT DOCUMENTS

| | | | |
|---|---|---|---|
| 3,624,830 | 11/1971 | Stehower et al. | 99/235 R |
| 3,685,751 | 8/1972 | Anders | 241/256 |
| 3,792,950 | 2/1974 | Cuff | 425/313 |
| 3,831,482 | 8/1974 | Eichler et al. | 83/675 |
| 3,832,114 | 8/1974 | Yoshida | 425/313 |
| 3,912,434 | 10/1975 | Nagahara et al. | 425/142 |
| 3,981,959 | 9/1976 | Cuff | 264/142 |
| 3,993,796 | 11/1976 | Steinke | 426/454 X |
| 4,001,452 | 1/1977 | Williams | 426/454 |
| 4,021,176 | 5/1977 | Dettmer et al. | 425/313 |
| 4,099,900 | 7/1978 | Bradbury et al. | 425/313 |
| 4,123,207 | 10/1978 | Dudley | 425/67 |
| 4,150,595 | 4/1979 | Loffler et al. | 83/171 |
| 4,179,255 | 12/1979 | Hale | 425/67 |
| 4,184,833 | 1/1980 | Buchan et al. | 425/311 |
| 4,321,026 | 3/1982 | Lambertus | 425/142 |
| 4,461,737 | 7/1984 | Voss | 264/142 |
| 4,500,271 | 2/1985 | Smith | 425/67 |
| 4,529,370 | 7/1985 | Holmes et al. | 425/142 |
| 4,585,660 | 4/1986 | Sugisawa et al. | 426/445 X |
| 4,971,820 | 11/1990 | Likuski et al. | 426/454 X |
| 5,120,559 | 6/1992 | Rizui et al. | 426/448 X |
| 5,120,565 | 6/1992 | Lonter et al. | 426/623 |

FOREIGN PATENT DOCUMENTS 694276  9/1964  Canada .................................. 426/448

*Primary Examiner*—Esther Kepplinger
*Assistant Examiner*—Milton I. Cano
*Attorney, Agent, or Firm*—Merchant, Gould, Smith, Edell, Welter & Schmidt

[57] ABSTRACT

A process for enrichment of animal food with fat is described wherein air cell bubbles are introduced to a highly dense product in the extrusion system by the utilization of carbonation technology into the oils and fats with various functional and textural properties. It includes the use of low to highly charged oils and fats with various gases under pressure injected into the extrusion stream within the extruder under lower pressure to assist in the expansion of the extrudate once it leaves the die nozzle.

7 Claims, 1 Drawing Sheet

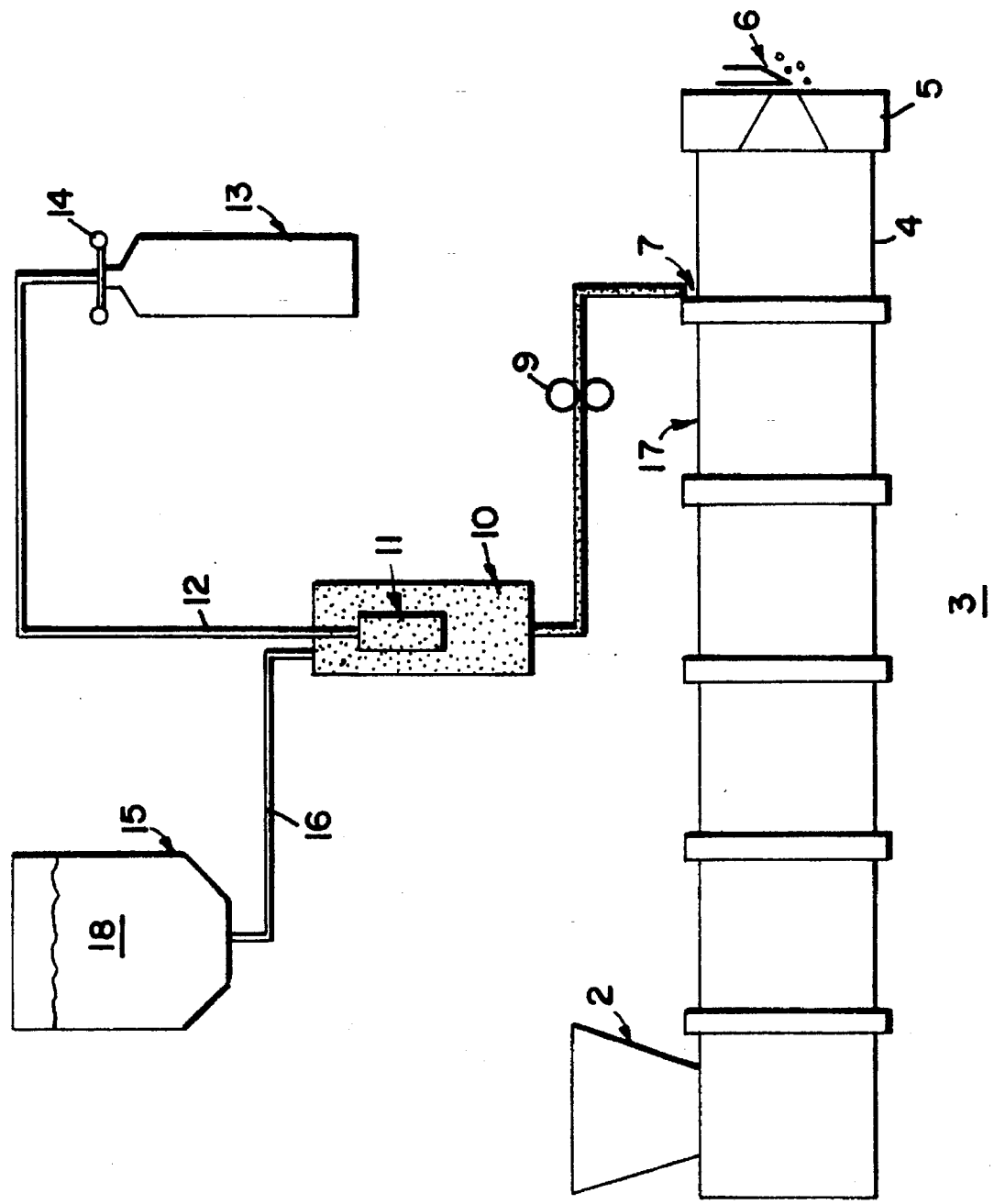

PROCESS FOR MANUFACTURING FAT-ENRICHED FOODS

FIELD OF THE INVENTION

The present invention is related to a process for preparing foods with increased fat levels by introducing a gas saturated oil medium in an extrusion process.

BACKGROUND OF THE INVENTION

The pet food industry has undergone a remarkable evolution within the last few years, perhaps due largely to greater demand by competitors and an increase in specialty markets generated in response to the more knowledgeable consumer. From one aspect, the market is increasingly demanding pet foods lower in fat to compensate for lower activity levels of many modern pets. On the other hand, a very specific segment of the market is demanding a nutritious, high fat diet for specialty feed, as well as for starter or younger pets. Pet foods with high fat composition are very desirable in most instances because: 1) The cost of fat is lower than most other ingredients. 2) Fats can carry a variety of flavors due to their ability to easily encapsulate the flavors. 3) Fats provide a very palatable taste to the food and can be a source of texture development. 4) For specialty feeds, aquafeed, and adolescent house pets, fat is used as a source of high energy and nutrition.

Extrusion cooking has been and is becoming a more widely and commonly used processing technique in the pet food industry, with a concomitant rapid rise in the extent of extruder sophistication and ease of operation. Improved technology, innovative processing, and the introduction of twin screw extruders into various markets opened a broad horizon for new process development, incorporating a wide variety of steps.

Use of carbonation in the food industry has been exclusively used in the area of carbonated waters. This technology has found itself to be useful in only a small part of the food industry with not much application into the pet food or feed industry. This has mainly been due to greater demand for a lower fat content in the food and the pet food industry. However, with the new developments in the specialty pet food and feed markets, more and more new niche areas have been developed, some of which are in need of very high fat and high protein content products as mentioned above. The feed industry also has gone through a shift in the fat requirements for specific feeds, some requiring as high as 50% fat or greater, with the majority of the rest of the ingredients to be made of proteins and carbohydrates. In order to achieve the fat requirements necessitated by the above markets, three process approaches have been attempted. 1) The first approach was to try to incorporate the fat within the extrusion system in order to encapsulate the fat within the proteins and carbohydrates matrix. This is limited by the type of the extruder being used in the process, as well as the extent of denaturation and gelatinization of the matrix being 8%, and the twin screw extruder can incorporate up to 18–20% unless the process is below the melting point of the fat and the fat is of a very high hydration value, in which case the extruder is used as a cold former. 2) Another approach was the encapsulation of the fat by the protein carbohydrate shell extruded at the die in the form of a tube in which the fat is co-extruded and sealed into a pillow like consistency. Thus the formed and cut piece contains fat within the structure in the form of a filled pillow. 3) The third process incorporated the use of fat sprayed onto the surface of the cut extrudate at the die or the use of a tumbler with a fat spray system application to the surface of the extrudate after it has been cooled or dried.

All of the above methods are limited in one form or another. The first two methods have a maximum incorporation of fat of less than 20%, with pellets or extrudates having a very high density, thus causing the separation of the fat from the pellets due to high density and weight of the pellets during storage and shipping. It also has a negative market view by the customer of not getting much for the price due to the high density of the end product. There is a need to incorporate the lower density extrudate with a higher fat content.

SUMMARY OF THE INVENTION

The present invention relates to a process which fulfills the need of providing a low density extrudate with a high fat content, e.g, up to 40% increase, by incorporation of microbubbles into a fat or liquid medium injected into an extruder before the die to provide an expansion of extrudate at the time of the exit from the die, thereby incorporating the fat back into the extrudate from the surface of the pellet. The second application of this process is to inject the charged oil or medium into the extruder and extrude the pellet directly into a hot oil medium in which the cutter is incorporated, cutting the mixed extrudate into pellets and then processing the pellets in a known manner to a finished product.

The latter process is described in my co-pending application, now U.S. Pat. No. 5,527,553.

Accordingly, the present invention is a method of manufacturing a fat-enriched low bulk density food extrudate comprising:

mixing a gas saturated medium with an extrudate within an extruder preferably the last sections of an extruder;

exiting of the resulting mixed extrudate through a die, and expanding said mixed extrudate through release of pressure.

The process of the present invention produces a product that is high in fat, between 12–30% or higher, and is able to be extruded at low moisture and low density. The low density of the extrudate is directly proportional to the number of air cells formed at the time of release of pressure upon the extrudate exiting the die. To achieve this condition, the industry has previously utilized moisture at high temperatures and pressures within the extruder so that as the extrudate exits the die, the pressure of the extrudate is released and moisture goes through a phase shift. In a process where moisture needs to be limited and oil is a dominant component of the product structure, the addition of a gas saturated oil medium injected into the extruder provides bubble formations within the extrudate without obtaining high temperatures or pressures required in previous processes. Since the gas saturated oil medium is under pressure after gasification and is injected under pressure into the extruder, the expansion taking place at the die is due to expansion of the gases within the matrix of the extrudate overcoming the cohesive force of the matrix. The major benefit to this system is its independence from moisture for the expansion of the pellet, as well as incorporation of oil carrying the gasification into the matrix structure.

BRIEF DESCRIPTION OF THE DRAWING

The drawing is a representation of the extrusion process wherein oil is saturated with a gas and the gas saturated medium injected into the extruder.

DESCRIPTION OF THE PREFERRED EMBODIMENTS

By reference to the drawing, an animal food recipe or dense, low-moisture food composition, described below, is fed to extruder 3 through dry feed inlet 2. The extruder subjects the composition to a temperature between about 20° to 250° F. and pressures between about 250–3,000 psi. The oil medium 18 in reservoir 15 is fed to an aeration chamber 10 through oil line 16, where the oil may be heated or cooled. Gas from a high pressure reservoir 13 through regulator 14 is fed by high pressure gas line 12 to the aeration chamber, preferably through a porcelain gas incorporator 11 to form microbubbles. The gas is added to the oil to the point of saturation then the gas saturated medium pumped by high pressure pumps 9 at pressures between about 50–1000 psi and injected through high pressure injection port 7 into the last extruder barrel 4 where the mixture of gas saturated medium and extrudate takes place. The mixed extrudate then exits through the die 5, and by expansion due to release of pressure. The mixture of extrudate and gas saturated medium within the extruder may be under pressures between about 150–3,000 psi. The temperature within the extruder may vary from about −20°F. to about 250°F. If the extruder is adapted with an outer oil cutting device, expansion of the extrudate at the die will result in even greater absorption of fat. The extrudate at the point of exit from the die can be cut with cutter knife 6 to form pellets, which then may be further treated in a known manner to achieve a final desired end product, e.g. dried and transported to a packaging operation.

The second most important aspect of this process deals with the method of gasification of the medium. It is crucial to form microbubbles during gasification of the medium in order to well disperse the gas bubbles and keep them in suspension throughout the medium. There are a number of mechanisms by which the microbubbles can be introduced. These include porcelain filters 11 with micropores commonly used in aquatic fixtures for aeration of water. Another mechanism is the use of a high pressure homogenizer commonly used in the milk processing industry. Certain additional compounds or chemicals may be added to some of the fats and/or oils, so that the gas bubbles can be maintained at a small size, preferably at the micro-size level. These include surfactants or emulsifiers, and the nutritional requirements will dictate which types of such chemicals should be used.

Additionally, special care should be taken so that the medium has lower pressure than the gas being infused into it, and that the charged medium has a higher pressure than the port of the extruder where the injection takes place into the extrudate.

As used above and hereinafter, the term "gas saturated medium" is an oil medium wherein the oil is aerated to a saturation point with a gas. Gases which may be used are, for example, nitrogen, oxygen, carbon dioxide, helium, argon, or other gases common to the food industry, which are approved by the Food and Drug Administration. Preferred is carbon dioxide.

The oil in the oil medium employed in the gas saturated medium is such that the extrudate is insoluble therein. The oil falls within the definition of fats and includes glycerol or a glycerol ester of fatty acid(s): Fats generally are substances of plant and animal origin. Useful fats for the present process are preferably in liquid form, e.g., as vegetable oils, or in liquid form at the temperatures employed.

The glycerol esters are predominantly of the triglyceride type, vegetable oils and fats may also contain some di- and even mono-glycerides. Fatty acid component of fats and vegetable oils encompass the range of fatty acids containing from about 8–22 carbon atoms, primarily in a range of C12 and C18. Although most of the fatty acid content is saturated linear alkanoic acid, some of the fatty acid content may be unsaturated, as exemplified by oleic and linoleic acid. Examples of preferred fats and oils used in the present invention are partially hydrogenated vegetable oil comprising soybean and cottonseed oil mixtures in liquid flake form, partially hydrogenated vegetable oil containing a mixture of palm kernel and coconut oils in liquid form, partially hydrogenated nonvegetable coconut oil in liquid plastic form, partially hydrogenated vegetable oil in liquid flake form comprising a mixture of a palm kernel and cottonseed with lecithin, hydrogenated cottonseed oil, hydrogenated palm oil, hydrogenated soybean oil, hydrogenated vegetable oil in liquid form containing a mixture of rapeseed, cottonseed and soybean oil, partially hydrogenated vegetable oil in paste or margarine type of form which contains a mixture of soybean and cottonseed oils with water, salt, nonfat milk, lecithin, mono and diglycerides, sodium benzoate, artificial color, artificial flavor, vitamin A palmitate, soybean oil, corn oil, coconut oil, mono and diglycerides, ethoxylated mono and diglycerides, polyglycerol esters of fatty acids, and polyglycerol as fatty acids.

The extrudate of the present process is a dense, low-moisture food composition extruded as described above and is obtained from recipes used in foods, particularly pet foods, prior to fat enrichment. The ingredients are preferably a mixture of cellulose polymers, e.g., cellulose, cellulose ethers, hydroxyalkyl celluloses such as hydroxy methyl cellulose, and the like, proteins, e.g., yeast extracts, milk solids, soya, and the like, sugars, e.g., sucrose, glucose, fructose and the like, starches, e.g., corn, potato, amylose, amylopectin and the like, hydrocolloids, whole grain meal, e.g. wheat, oat, corn and the like, and fats such as glycerides, substances of plant and animal origin, as solids, e.g. tallow, lard, butter, margarine or other shortenings or in liquid form as defined below. Fats also include organic polymers such as polyglycerol esters of fatty acids and polyglycerol as fatty acids.

I claim:

1. A method of manufacturing a fat-enriched low bulk density animal food extrudate comprising the steps of:

adding a gas into an oil medium to form a gas saturated oil medium wherein the gas in the oil medium is in the form of microbubbles;

injecting the gas saturated oil medium into an extruder;

mixing the gas saturated oil medium with an animal food extrudate within the extruder;

exiting of the resulting mixed extrudate through a die, and expanding said mixed extrudate through release of pressure.

2. The method of claim 1 wherein the mixed extrudate in the extruder is under pressure between about 150 to 3,000 psi.

3. The method of claim 1 wherein the temperature in the extruder with the mixed extrudate is between about −20° to 250° F.

4. The method of claim 1 wherein the gas is nitrogen, helium, oxygen or carbon dioxide.

5. The method of claim 4, wherein the gas is carbon dioxide.

6. The method of claim 1 wherein the resulting mixed extrudate contains up to 40% increase in fat content.

7. A method of manufacturing a fat-enriched low bulk density animal food extrudate comprising the steps of:

adding a gas into an oil medium to form a gas saturated oil medium wherein the gas in the oil medium is in the form of microbubbles;

injecting the gas saturated oil medium into an extruder;

mixing the gas saturated oil medium with an animal food extrudate within the last sections of the extruder;

exiting the resulting mixed extrudate through a die directly into a hot oil medium comprising cutting means, and cutting the mixed extrudate into pellets.

* * * * *